Jan. 13, 1931.  G. RIESS  1,789,193
HEADLIGHT FOR VEHICLES
Filed Sept. 11, 1929
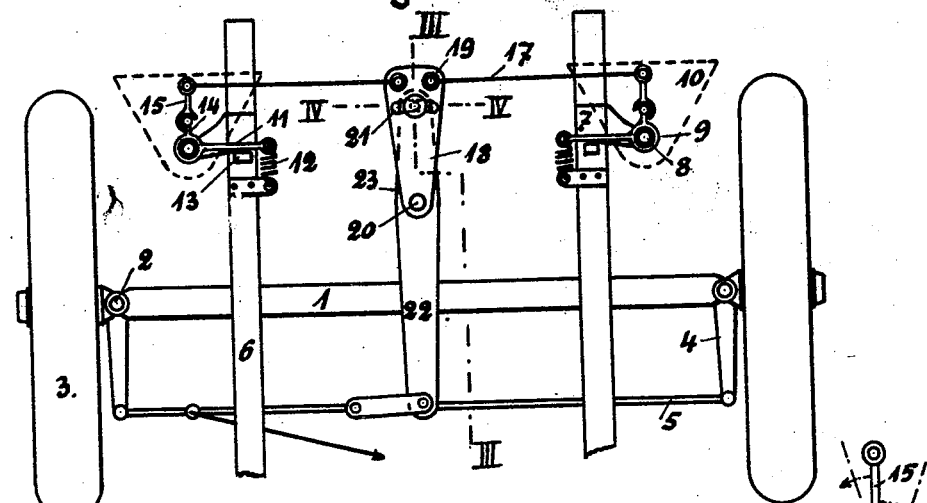
Fig. 1.
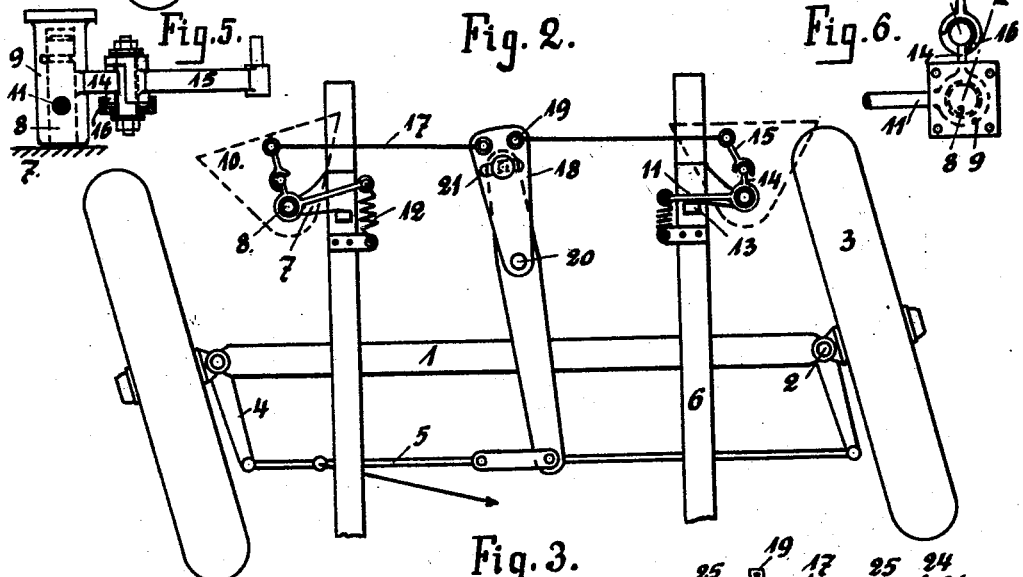
Fig. 5.  Fig. 2.  Fig. 6.
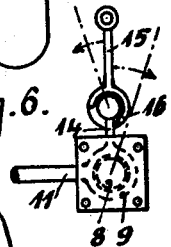
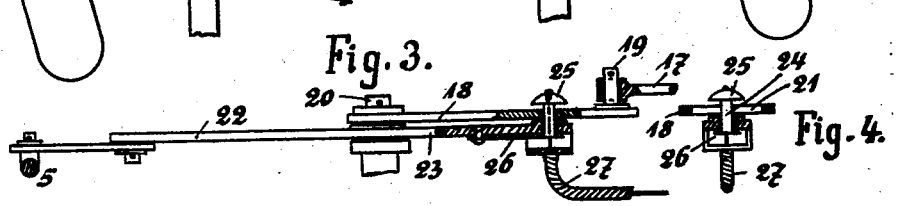
Fig. 3.
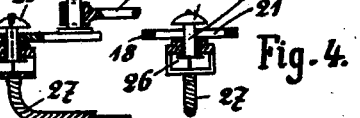
Fig. 4.
Inventor
Gustav Riess
By
Attorney Patented Jan. 13, 1931

1,789,193

UNITED STATES PATENT OFFICE

GUSTAV RIESS, OF SCHENKENHORST, GERMANY

HEADLIGHT FOR VEHICLES

Application filed September 11, 1929, Serial No. 391,942, and in Germany May 25, 1929.

This invention relates to an arrangement on vehicles, designed to effect a turning of the lamps to the side in the direction of travel when making sharp turns or rounding curves or corners. The arrangement is connected with the steering centre of the vehicle in such a manner, that the turning of the headlights takes place always according to the rotation of the steering wheel, and that only that lamp carries out this movement, which is situated on the inner side of the curve to be made, whereas the other lamp remains in the direction of the central line of the vehicle. The turning of the lamps takes place however only, when this is intended by the driver, but might be adjusted for permanent effect.

An embodiment of the invention is diagrammatically illustrated by way of example in the accompanying drawing in which:

Fig. 1 is a top plan view of the front portion of the car frame of a motor car, the elements being shown in the position which they assume when the car is running straight ahead.

Fig. 2 is a similar view, showing the position at turning to the left.

Fig. 3 is a section on line III—III of Fig. 1.

Fig. 4 is a section on the line IV—IV of Fig. 1.

Fig. 5 shows a pivotable lamp holder with control lever in side elevation.

Fig. 6 is a top plan view of Fig. 5.

1 designates the front axle, 2 the links of the front wheels 3, 4 the adjusting levers and 5 the connecting rod of the same. On the sills 6 arms 7 are fixed, which carry rods 8 serving as axles for the tubes 9 carrying the headlights 10 indicated in dash lines. On each tubular holder 9 a radial lever 11 is fixed, on the end of which a spring 12 acts, the other end of which spring is attached to the sill 6, the lever 11 being thus pulled against a stop 13 so that the headlight is secured in the forward directed position. On each tubular headlight holder 9 a lever arrangement is mounted, consisting of two levers 14, 15 hingedly connected with one another so that they can bend only in one direction, remaining stretched under a pressure from the other direction as shown in Fig. 6. The freely oscillatable lever 15 has an extension 16 bearing against one side of the spherical head of the fixed lever 14.

The outer end of each oscillatable lever 15 is hingedly mounted on a connecting rod 14, said connecting rods being hingedly mounted on a plate 18 by means of hinge bolts 19. The plate 18 forms a one-armed lever, oscillatably mounted on a pin 20 fixed on the car frame. This plate 18 has a slot 21. A two-armed lever 22—23 is oscillatably mounted under the plate 18 on the pivot pin 20, the arm 22 of this lever being hingedly connected to the connecting rod 5, the other arm 23 of said lever having a bore with which a bolt 24 engages, said bolt extending also through the slot 21, and it has a large head 25 standing above the plate 18. A blade spring 26 bears against the lower end of said bolt 24. A Bowden cable 27 is attached to the lower end of bolt 24 and to a suitable point near the driver's seat.

The springs 12 adjust the headlights and the oscillatable lever 18 in the direction of the axis of the car. The two-armed lever 22, 23, controlled from the steering mechanism of the car, slides ineffective at the steering under the plate 18, the bolt 24 sliding along the slot 21. When the Bowden cable is operated, it pulls the bolt 24 downward so that its head 25 presses against the plate 18 and this plate is pressed against the arm 23 of the double lever 22, 23 so that, by this plate 18 and the left connecting rod 17, the left headlight is turned, whereas the right connecting rod 17 bends the corresponding lever 14, 15 to one side so that the right hand headlight remains in its position. The adjusting of the headlights is changed accordingly, when the car is being steered to the right.

I claim:—

1. In combination with a vehicle having a wheel steering mechanism, a mechanism for controlling the headlights of the vehicle comprising: arms fixed on each sill, a rod on the free end of each arm, a tubular lamp holder on each rod, a radial lever on said tubular holder, a spring between the free end of said lever and a stationary point of the car frame, a lever composed of two hingedly connected arms adapted to be bent in one direction only connected to said tubular holder, and hinged rods connecting said lever to the steering mechanism of the vehicle.

2. In combination with a vehicle having a wheel steering mechanism, a mechanism for controlling the headlights of the vehicle comprising: arms fixed on each sill, a rod on the free end of each arm, a tubular lamp holder on each rod, a radial lever on said tubular holder, a spring between the free end of said lever and a stationary point of the car frame, a lever composed of two hingedly connected arms adapted to be bent in one direction only connected to said tubular holder, connecting rods hingedly connected one to the outer end of each lever adapted to bend in one direction, an oscillatable plate mounted in the axial direction of the car to the front end of which said two connecting rods are hingedly connected and having a transverse slot, a two-armed lever oscillatably mounted under said plate on the pivot axle of the same the rear arm of said two-armed lever hingedly connected to the connecting rod of the hinges of the front wheels of the car, a vertical bolt shiftably mounted on the front end of the front arm of said two-armed lever projecting through said slot of said plate, a large head of said bolt, and a Bowden cable connecting said bolt with a point near the driver's seat.

In testimony whereof I affix my signature.

GUSTAV RIESS.